(12) United States Patent
Mueck et al.

(10) Patent No.: US 11,432,162 B2
(45) Date of Patent: Aug. 30, 2022

(54) TECHNIQUES FOR CONTROLLING SPECTRUM USAGE OF A HIERARCHICAL COMMUNICATION SYSTEM

(71) Applicant: Intel Corporation, Santa Clara, CA (US)

(72) Inventors: Markus Dominik Mueck, Unterhaching (DE); Christian Drewes, Germering (DE); Kostas Tsagkaris, Athens (GR); Panagiotis Demestichas, Piraeus (GR); Michalis Michaloliakos, Piraeus (GR); Stavroula Vassaki, Stockholm (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,735

(22) PCT Filed: Jan. 28, 2019

(86) PCT No.: PCT/US2019/015372
§ 371 (c)(1),
(2) Date: Jun. 25, 2020

(87) PCT Pub. No.: WO2019/156836
PCT Pub. Date: Aug. 15, 2019

(65) Prior Publication Data
US 2020/0382963 A1 Dec. 3, 2020

(30) Foreign Application Priority Data

Feb. 12, 2018 (EP) .................................... 18156300

(51) Int. Cl.
*H04W 16/14* (2009.01)
*H04W 16/04* (2009.01)
(Continued)

(52) U.S. Cl.
CPC ........... *H04W 16/14* (2013.01); *H04W 16/04* (2013.01); *H04W 24/02* (2013.01); *H04W 88/08* (2013.01)

(58) Field of Classification Search
CPC ..... H04W 76/27; H04W 72/042; H04W 8/02; H04W 84/045; H04W 36/14;
(Continued)

(56) References Cited

U.S. PATENT DOCUMENTS 8,892,113 B2   11/2014  Ratasuk et al.
2008/0222021 A1   9/2008  Stanforth et al.
(Continued)

FOREIGN PATENT DOCUMENTS

WO    2015048756 A1    4/2015
WO    2016182634 A1   11/2016
(Continued)

OTHER PUBLICATIONS

Federal Communications Commission. "Report and order and second further notice of proposed rulemaking." Amendment of the Commission's Rules with Regard to Commercial Operations in the 3550-3650 MHz Band; Apr. 21, 2015; 187 pages.
(Continued)

*Primary Examiner* — Inder P Mehra
(74) *Attorney, Agent, or Firm* — Viering, Jentschura & Partner mbB

(57) ABSTRACT

The disclosure relates to an access point (AP) device for controlling spectrum usage of a hierarchical communication system, in which a spectrum reserved for an Incumbent is usable by at least one user equipment (UE) for transmission when the spectrum is not required by the Incumbent, the AP device comprising a processor configured to: enforce the at least one UE into a mode protecting use of the spectrum by the Incumbent based on a spectrum request indication from
(Continued)

the Incumbent; and enable transmission of the at least one UE using the spectrum reserved for the Incumbent based on a spectrum availability indication from the Incumbent.

19 Claims, 11 Drawing Sheets

(51) Int. Cl.
*H04W 24/02* (2009.01)
*H04W 88/08* (2009.01)

(58) Field of Classification Search
CPC ..... H04W 48/16; H04W 8/186; H04W 48/12; H04W 48/14; H04W 52/80; H04W 72/082; H04W 36/08; H04W 72/0453
USPC ........................................................ 370/329
See application file for complete search history.

(56) References Cited

U.S. PATENT DOCUMENTS

| | | | |
|---|---|---|---|
| 2009/0196180 A1 | 8/2009 | Bahl et al. | |
| 2010/0070931 A1* | 3/2010 | Nichols ................. | G06F 3/0488 715/863 |
| 2010/0271948 A1 | 10/2010 | Challapali et al. | |
| 2014/0254837 A1* | 9/2014 | Mortensen ............... | H03F 3/68 381/120 |
| 2015/0304853 A1 | 10/2015 | Murray et al. | |
| 2015/0373554 A1* | 12/2015 | Freda ..................... | H04W 16/14 455/450 |
| 2016/0050670 A1* | 2/2016 | Stephenne .......... | H04W 72/085 370/230 |
| 2016/0066192 A1 | 3/2016 | Markwart et al. | |
| 2016/0094995 A1* | 3/2016 | Vannithamby ........ | H04W 72/08 370/329 |
| 2016/0262024 A1* | 9/2016 | Freda .................... | H04W 16/14 |
| 2017/0171762 A1* | 6/2017 | Reis ....................... | H04W 64/00 |
| 2018/0049036 A1* | 2/2018 | Sethi ................. | H04W 72/0453 |
| 2019/0059000 A1* | 2/2019 | Sun ........................ | H04W 16/14 |
| 2020/0053649 A1* | 2/2020 | Yao ................... | H04W 72/0406 |

FOREIGN PATENT DOCUMENTS

| | | |
|---|---|---|
| WO | 2016195751 A1 | 12/2016 |
| WO | 2017052517 A1 | 3/2017 |

OTHER PUBLICATIONS

Sohul et al.; "Spectrum access system for the citizen broadband radio service."; IEEE Communications Magazine vol. 53 Issue 7; Jul. 2015; pp. 18-25.

Kim et al.: "Design and implementation of an end-to-end architecture for 3.5 GHz shared spectrum." IEEE International Symposium on Dynamic Spectrum Access Networks (DySPAN), 2015; pp. 23-34.

Zhang et al. "Auction approaches for resource allocation in wireless systems: A survey."; IEEE Communications surveys & tutorials vol. 15 No. 3; Third Quarter 2013; pp. 1020-1041.

ETSI; "Reconfigurable Radio System (RRS); Use Cases for Operation in White Space Frequency Bands"; European Telecommunications Standards Institute; vol. 1, Issue 7; 66 pages; Nov. 2012.

European search Report issued for corresponding EP patent application EP 18 15 6300, dated Jul. 13, 2018, 2 pages(for informational purpose only).

International search report issued for corresponding PCT application PCT/US2019/015372, dated Apr. 29, 2019, 3 pages (for informational purpose only).

* cited by examiner

TECHNIQUES FOR CONTROLLING SPECTRUM USAGE OF A HIERARCHICAL COMMUNICATION SYSTEM

CROSS-REFERENCE TO RELATED APPLICATIONS

This application is a national stage entry, according to 35 U.S.C. § 371, of PCT Application No. PCT/US2019/015372 filed on Jan. 28, 2019, which claims priority to European Application No. 18 156 300.8 filed on Feb. 12, 2018, both of which are herein incorporated by reference in their entirety.

FIELD

The disclosure relates to an access point (AP) device and techniques for controlling spectrum usage of a hierarchical communication system, in which a spectrum reserved for an Incumbent is usable by at least one user equipment (UE) for transmission when the spectrum is not required by the Incumbent. The disclosure further relates to integration of a decentralized network such as WiFi into a centralized network such as Spectrum Access System (SAS) or Licensed Shared Access (LSA) system through application layer communication using standardized Application Programming Interfaces (APIs).

BACKGROUND

Spectrum Access System (SAS) based spectrum sharing will be applied in the US in the 3.5 GHz band (and possibly in further bands in the future). In Europe, the so-called Licensed Shared Access (LSA) system will be implemented in the 2.3-2.4 GHz band. In SAS three types of users are defined: i) Incumbent (highest priority), ii) Priority Access License (PAL) User ($2^{nd}$ level of priority) and iii) General Authorized Access (GAA) Users such as MuLTEfire, etc. with specific changes to address SAS requirements (such as Incumbent protection, etc.). Currently there is no mechanism defined for an interaction of a decentralized network such as WiFi with a centralized system such as SAS in such a manner that the WiFi access is suppressed when an Incumbent is active and reactivated when the Incumbent is silent.

In the following a technique for controlling spectrum usage in a hierarchical communication system is presented.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
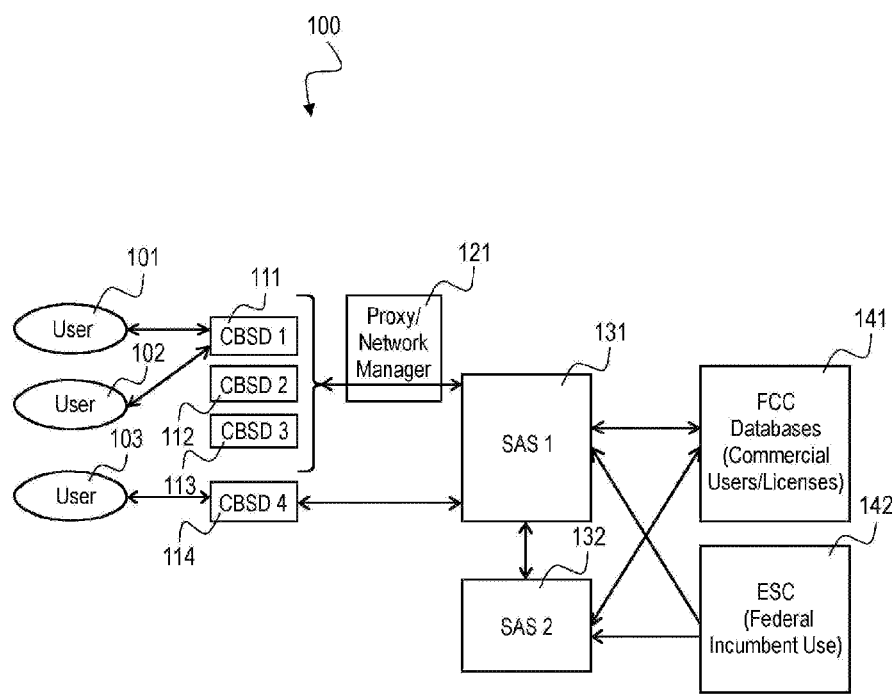
FIG. 1 is a block diagram of a Spectrum Access System (SAS) 100 for spectrum management according to the FCC regulation.

In the context of this disclosure, spectrum access systems and spectrum access networks are described for sharing spectrum resources between different radio networks according to a spectrum sharing scheme. Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz), 5925-6425 MHz or part thereof and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz, 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.].

In the following, RLAN devices such as RLAN user equipments (UEs) and RLAN access points (APs) are described. Radio Local Area Networks (RLANs) are intended to cover smaller geographic areas like homes, offices and to a certain extent buildings being adjacent to each other. Radio LANs are also known as Wireless LANs (WLANs). A popular deployment of Radio LANs is providing broadband connectivity at public locations like airports, railway stations, conference centres, hotels and street café s. Even on trains and aboard aircraft Radio LANs are or will become available for providing network access. Radio LANs are also rather popular at home and at the office enabling the users to connect all equipment wirelessly. Currently, the frequency bands 2.4 GHz and 5 GHz are mainly used by Radio LANs and in many cases, the deployed technology is based on the IEEE 802.11 standards family. However, other technologies such as LTE-LAA (Long Term Evolution License Assisted Access) are deployed in those frequency bands as well.

Some of the features in this document are defined for the network side, such as Access Points, eNodeBs, etc. Still, a User Equipment (UE) may take this role as well and act as an Access Points, eNodeBs, etc. I.e., some or all features defined for network equipment may be implemented by a UE.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense. The following terms, abbreviations and notations will be used herein.

RLAN: Radio Local Area Network,
3GPP: 3rd Generation Partnership Project,
LTE: Long Term Evolution,
LTE-A: LTE Advanced, Release 10 and higher versions of 3GPP LTE,
BS: Base station, eNodeB,
FCC: Federal Communications Commission,
SAS: Spectrum Access System,
LSA: Licensed Shared Access
PA: Priority Access,
GAA: General Authorized Access,
PAL: Priority Access Licenses,
ASA: Authorized Shared Access,
CSS: Cloud Spectrum Services,
RF: Radio Frequency,
UE: User Equipment,
MIMO: Multiple Input Multiple Output,
TDD: Time Division Duplex,
FDD: Frequency Division Duplex,
CBSD: Citizen Broadband Radio Service Device It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The methods and devices described hereinafter may be applied in SAS systems, e.g. SAS systems 100 as shown in FIG. 1. The FCC (Federal Communications Commission) released a Report and Order outlining the rules for operating wireless devices in the 3.5 GHz band that spans from 3550-3700 MHz. FCC released this spectrum for sharing with the incumbents, which means that the incumbents get priority in that band and it can be used by broadband devices when (and where) incumbents are not using the spectrum. The incumbents in this band include DoD radars. There are two additional tiers of spectrum users in addition to the incumbents namely the Priority Access (PA) and General Authorized Access (GAA). The Priority Access Licenses (PAL) users get protection from GAA users which is similar to unlicensed spectrum.

The FCC also mandates a Spectrum Access System (SAS) that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s) as shown in FIG. 1. If there are multiple SASs, they are supposed to be synchronized with each other. However, the FCC does not specify details of how the SAS have to be implemented and what information has to be synchronized.

Figure 2:
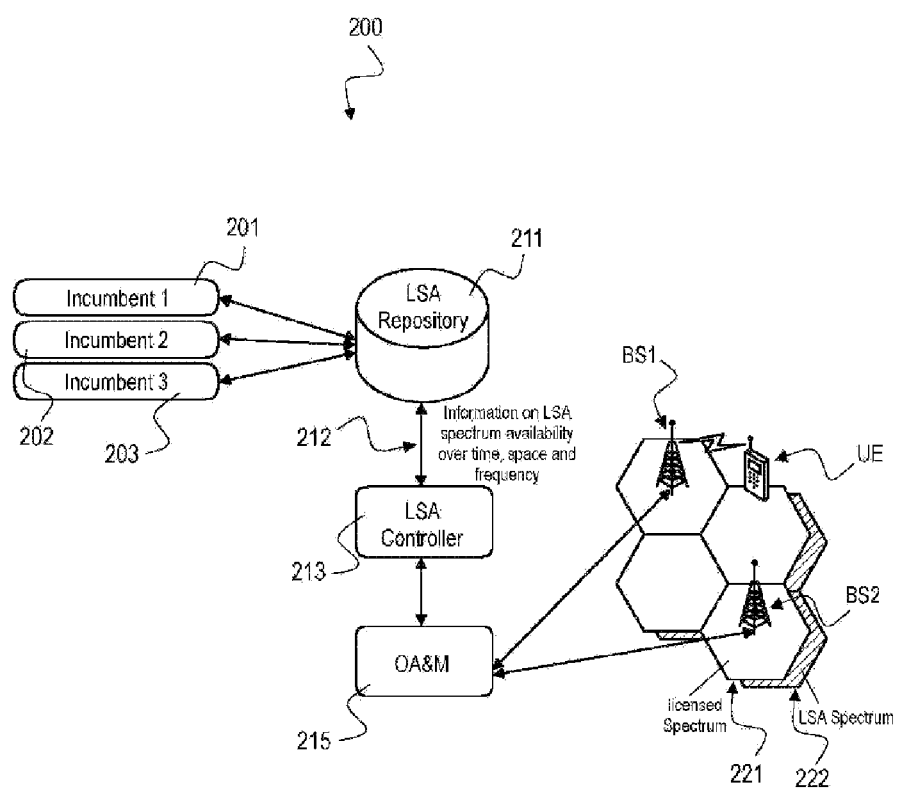
FIG. 2 is a block diagram of a Licensed Shared Access (LSA) system 200 as currently defined in Europe.

The methods and devices described hereinafter may be applied in LSA (Licensed Shared Access) systems, e.g. LSA systems 200 as shown in FIG. 2, ASA (Authorized Shared Access) systems and CSS (Cloud Spectrum Services) systems. The LSA (Licensed Shared Access) concept was recently developed by RSPG (Radio Spectrum Policy Group) on a European level. The objective is to propose a new way for answering to the operators' needs for more spectrum. It is expected that no more dedicated spectrum will be available for cellular operators for mobile communications in the future. LSA thus proposes mechanisms for introducing shared spectrum based solutions, i.e. mobile cellular operators will have access to additional licensed spectrum from other licensees (like public safety, government. etc.) which they normally would not get access to. LSA is based on a similar solution as ASA (Authorized Shared Access). ASA, however, is limited to IMT spectrum while LSA is also addressing non-IMT bands. Both exist on a rather conceptual level for the time being.

A related technology is CSS (Cloud Spectrum Services) which addresses the same framework as LSA and ASA, but introduces more detailed implementation solutions. On a regulatory level, there is massive interest for LSA/ASA/CSS, in particular in Europe. CEPT WG FM has agreed to launch a corresponding project team. ETSI RRS has finalized the set-up of a so-called SRDoc (System Reference Document) which targets in particular the 2.3-2.4 GHz Band which is expected to be one of the most straightforward candidates for shared spectrum usage. This is also acknowledged by CEPT WG FM. CEPT has taken the inputs into account in its CEPT WG FM project teams PT52 and PT53. While current activities focus on the 2.3-2.4 GHz band in Europe, it should be noted that the usage of the LSA concept is not limited to any specific frequency band. In fact, it is expected that the 2.3-2.4 GHz represents a first exercise and in the future LSA usage will be extended to other bands.

The methods and devices described hereinafter may be applied in WiFi and Bluetooth systems or any near field communication (NFC) technology. WiFi is a local area wireless computer networking technology that allows electronic devices to connect to the network, mainly using the 2.4 gigahertz (12 cm) UHF and 5 gigahertz (6 cm) SHF ISM radio bands. The Wi-Fi Alliance defines Wi-Fi as any "wireless local area network" (WLAN) product based on the IEEE 802.11 standards. However, the term "Wi-Fi" is used in general English as a synonym for WLAN since most modern WLANs are based on these standards. Many devices can use WiFi, e.g. personal computers, video-game consoles, smartphones, digital cameras, tablet computers and digital audio players. These can connect to a network resource such as the Internet via a wireless network access point. Such an access point (or hotspot) has a range of about 20 meters indoors and a greater range outdoors.

Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization.

The methods and devices described hereinafter may be applied in LTE FDD mode as well as in LTE TDD mode systems, e.g. LTE mode systems having a type 1 LTE frame structure or LTE mode systems having a type 2 LTE frame structure. The type 1 LTE frame includes 10 sub-frames 204 each having two slots 206. A basic type 1 LTE frame has an overall length of 10 milliseconds. The type 2 LTE frame has an overall length of 10 milliseconds. The 10 ms frame comprises two half frames, each 5 ms long.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The FCC released a Report and Order on Apr. 17, 2015 "FCC REPORT AND ORDER AND SECOND FURTHER NOTICE OF PROPOSED RULEMAKING, FCC 15-47, Apr. 21, 2015" outlining the rules for operating wireless devices in the 3.5 GHz band that spans from 3550-3700 MHz. FCC released this spectrum for sharing with the incumbents, which means that the incumbents get priority in that band and it can be used by broadband devices when (and where) incumbents are not using the spectrum. The incumbents in this band include DoD radars. There are two additional tiers of spectrum users in addition to the incumbents namely the Priority Access (PA) and General Authorized Access (GAA). The Priority Access Licenses (PAL) users get protection from GAA users which is similar to unlicensed spectrum.

The FCC also mandates a Spectrum Access System (SAS) that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s) as shown in FIG. 1. If there are multiple SASs, they are supposed to be synchronized with each other. However, the FCC does not specify details of how the SAS have to be implemented and what information has to be synchronized.

Recently, several efforts have been made in order to present an indicative SAS architecture that accommodates the tiered access to shared spectrum. In Spectrum Access Systems (SAS), the GAA users are able to (1) have access to a database with information about incumbent users' locations and frequency and (2) have access to the results of PAL auctions and subsequent PAL frequency assignments. GAA users need to check if the SAS band is clear to use or not before starting transmission. The incumbent usage will be informed or easy to detect because incumbent is transmitting at a high power.

FIG. 1 is a block diagram of a Spectrum Access System (SAS) 100 for spectrum management according to the FCC regulation. The SAS system includes an exemplary number of two central SAS coordinators 131, 132 for coordinating spectrum use between incumbents, PA (priority access) users and GAA (general authorized access) users according to FCC (Federal Communications Commission) standardization.

The SAS communication system 100 includes an exemplary number of two SAS entities (also referred to as SAS coordinator or SAS controller) 131, 132, FCC databases 141 and an ESC (Environmental Sensing Capability) entity 142 which are coupled between each other. An exemplary number of four CBSD (Citizen Broadband Radio Service Devices) entities 111, 112, 113, 114 are coupled with the SAS1 entity 131, where CBSD1, CBSD2 and CBSD3 are coupled via a proxy network manager 121. The CBSD devices may be coupled to users 101, 102, 103, 104. In the example of FIG. 1 the CBSD1 device is connected to a first user 101 and a second user 102 while CBSD4 device is connected to a third user 103.

The SAS entities 131, 132 have the following functionality: Enact and enforce all policies and procedures developed by the SAS Administrator; Determine and provide to CBSDs the permissible channels or frequencies at their location; Determine and provide to CBSDs the maximum permissible transmission power level at their location; Retain information on, and enforce, Exclusion Zones and Protection Zones; Communicate with the ESC to obtain information about federal Incumbent User transmissions and instruct CBSDs to move to another frequency range or cease transmissions; Ensure that CBSDs operate in geographic areas and within the maximum power levels required to protect federal Incumbent Users from harmful interference; Register and authenticate the identification information and location of the CBSDs; Ensure that CBSDs protect non-federal incumbent users from harmful interference; Protect Priority Accessed Licensees from interference caused by other PALs and from GAA users; Facilitate Coordination between GAA users operating Category B CBSDs; Resolve conflicting uses of the band while maintaining a stable radio frequency environment; Ensure secure and reliable transmission of information between the SASs and the GBSDs.

FIG. 2 is a block diagram of a Licensed Shared Access (LSA) system 200 as currently defined in Europe including an LSA controller 213 for adapting spectrum usage. The license shared access (LSA) communication system 200 includes a LSA repository 211, an LSA controller 213, an OA&M entity, an exemplary number of three incumbents 201, 202, 203 and a public mobile communication system having an exemplary number of two base stations BS1, BS2 and one exemplary user equipment UE connected to base station BS1. The public mobile communication system provides a licensed spectrum 221 and an LSA spectrum 222.

The LSA repository 211 may store information on LSA spectrum availability over time, space and frequency. The LSA controller 213 may be used for controlling access to the LSA system. The OA&M entity 215 may be used for maintaining operation of the LSA system.

While this disclosure mainly addresses the SAS case (US scenario) as shown in FIG. 1, the basic principles are also applicable to the European LSA context as shown in FIG. 2.

Figure 3:
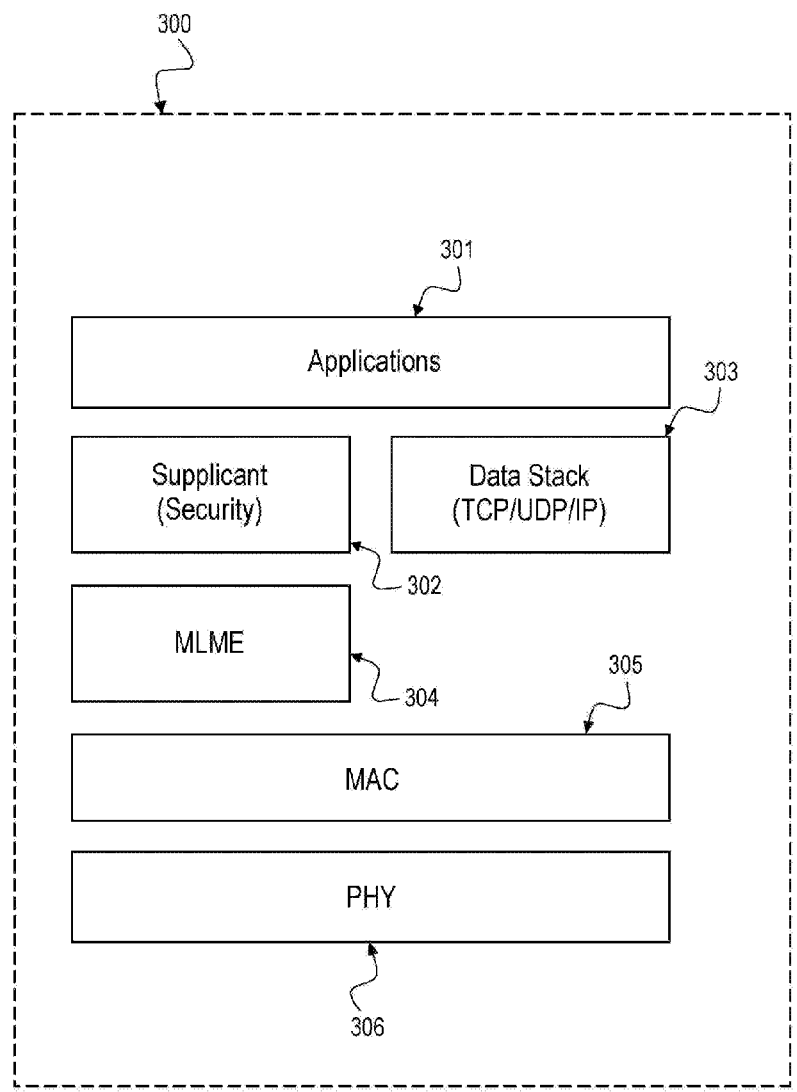
FIG. 3 is a schematic diagram illustrating an exemplary WiFi stack 300.

FIG. 3 is a schematic diagram illustrating an exemplary WiFi stack 300. The WiFi stack 300 can be a typical WiFi product stack compliant to the 802.11 protocol. The WiFi stack 300 includes (from bottom to top) a physical (PHY) layer 306, a media access control (MAC) layer 305, a data stack 303, e.g. for TCP/UDP/IP communication, and an applications layer 301. Optionally a MAC sublayer management entity (MLME) and a supplicant (security) layer 302 may be included. MLME stands for "MAC Sublayer Management Entity". It provides various management procedures such as association, authentication etc.

As presented in this disclosure, existing 802.11 Access Points can be extended in a minimum invasive way such that WiFi equipment can be made compliant to SAS and can be used as SAS GAA equipment.

In this disclosure a spectrum sharing context is considered, such as the FCC Citizen Broadband Radio System/Spectrum Access System (CBRS/SAS) in 3.5 GHz as shown in FIG. 1 or the Licensed Shared Access (LSA) system in 2.3-2.4 GHz in Europe as shown in FIG. 2. In particular, in the CBRS context, traditional RLAN systems (such as WiFi/MuLTEFire/etc.) can be used as so-called tier-3 devices. Changes over traditional RLAN system include the requirement to vacate the band when the incumbent user is coming in.

The disclosure presents a solution how to efficiently manage the vacating of a shared band by a RLAN system when the incumbent spectrum user retakes the band. RLAN systems traditionally do not offer the possibility to manage a higher-priority incumbent user. Existing RLAN bands indeed do not foresee a hierarchical responsibility chain for spectrum access.

A basic idea according to this disclosure is to complement a classical RLAN stack (as shown in FIG. 3) by an additional SAS SW stack which 1) Interacts with the RLAN stack on the Application Layer, i.e. on a driver-to-driver communication level (see left hand box in the illustration below which encapsulates the RLAN stack and the SAS SW stack); and 2) Interacts with an external SAS Controller. The SAS controller will thus provide commands such as i) change band, ii) stop band usage, etc. and the SAS SW stack on the RLAN component will translate these SAS controller commands into specific instructions to the classical RLAN stack. The driver-to-driver communication will be used in order to enforce the RLAN device into a mode which is suitably protecting the incumbent. Exemplary implementations of this basic idea are described in the following.

Figure 4:
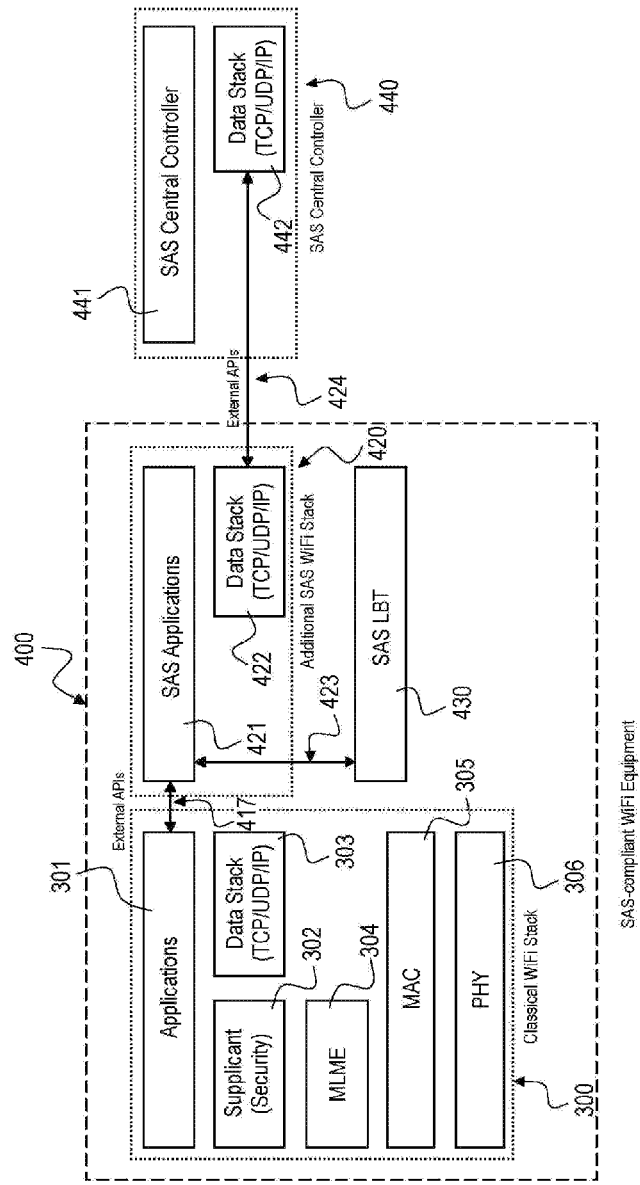
FIG. 4 is a schematic diagram illustrating an exemplary SAS compliant WiFi equipment 400 according to the disclosure.

FIG. 4 is a schematic diagram illustrating an exemplary SAS compliant WiFi equipment 400 according to the disclosure.

The idea is to add a second stack 420 into a WiFi equipment 300 which only interfaces through external standardized APIs 417 with the WiFi stack 300 and is thus minimum invasive. The WiFi stack 300 corresponds to the WiFi stack 300 described above with respect to FIG. 3. The additional SAS WiFi stack 420 includes an SAS applications layer which interacts through the external APIs 417 with the applications layer 301 of the WiFi stack 300. The additional SAS WiFi stack 420 may include a data stack 422 with TCP/UDP/IP functionality that may interact (via external APIs 424) with the data stack 442 with TCP/UDP/IP functionality of the SAS central controller. Alternatively, the SAS applications layer 421 of the additional SAS WiFi stack 420 may directly (without data stack) communicate with the SAS central controller applications layer 441 of the SAS central controller. Alternatively, an SAS LBT (Listen Before Talk) stack 430 may be included in the WiFi stack 300 which may interact via API interface 423 with the additional SAS WiFi stack 420. This LBT stack 430 can detect the Incumbents before transmitting data. If an Incumbent is available the WiFi network can be made silent.

The additional SAS WiFi stack 420 can provide all SAS related features. In some aspects of this disclosure, a concept is to include the "Additional SAS WiFi Stack" 420 into the original WiFi equipment 300. Since it only interacts through external interfaces 417 with the Applications layer 301, the approach is minimum intrusive.

The process is as follows: 1) If no incumbent is detected, the "SAS Applications" layer 421 accesses WiFi through standard external interfaces and activates WiFi. 2) If an incumbent is detected (either through interfacing with the SAS Central Controller or (optionally) through LBT 430 in the WiFi Equipment 300, then the SAS Application 421 puts the WiFi application on hold. Note that there is no need to fully terminate the connection (which would be the standard way of proceeding). Rather, the connection can be maintained but without accessing the medium any more while the Incumbent is present. Once the incumbent is gone, using the existing connection can be simply continued. 3) The SAS Applications layer needs to performs the following tasks: a) Access to SAS Central Controller in order to request information on presence of Incumbent; b) Provide sensing data to SAS Central Controller in case that the Incumbent is detected through the SAS LBT feature 430 (in case it is available); c) Authorize usage of WiFi channel(s) to WiFi stack 300 through external interfaces 417 (minimum intrusive); d) Put WiFi Communication on hold while incumbent is present or move WiFi to another channel (following indications from SAS Central Controller).

To support the required features for incumbent protection, in an exemplary implementation the following new driver commands are introduced for RLAN systems referring to the following actions: a) Group creation/management of Users/CBSDs (Grouping commands); b) Request vacating of spectrum/Enable spectrum usage (Spectrum usage commands).

In the following, Examples of Grouping Commands are described. The first set of commands enable SAS controller to group CBSDs (RLAN Access Points—APs) or the CBSD (AP) to group users (for example users in a specific geographic location concerned by the arrival of an incumbent, users whose output power levels exceed a given threshold, etc.) and to assign a group ID to those CBSDs/users. The SAS SW stack (on the RLAN device) enforces this grouping by the following new driver commands as shown below in Tables 1 and 2:

TABLE 1

Creation of group: the SAS or the CBSD (AP) sends this command in order to create groups of CBSDs (APs)/users. Example syntax: groupCreate(groupLevel, userID/cbsdID, userMACaddress/cbsdMACaddress, groupID).

| Parameter Name | Data Type | Description |
|---|---|---|
| groupLevel | String {'SAS', 'CBSD'} | The entity that enforces the grouping (it can be either SAS to CBSD or CBSD to its users) |

TABLE 1-continued

Creation of group: the SAS or the CBSD (AP) sends this command in order to create groups of CBSDs (APs)/users. Example syntax: groupCreate(groupLevel, userID/cbsdID, userMACaddress/cbsdMACaddress, groupID).

| Parameter Name | Data Type | Description |
|---|---|---|
| userID | String | A unique identifier for a CBSD user |
| cbsdID | String | A unique identifier for each CBSD registered to SAS |
| userMACaddr | Number | The MAC address of the CBSD user |
| cbsdMACaddr | Number | The MAC address of the registered CBSDs |
| groupID | String | A unique identifier for each group of CBSDs or CBSD's users |

TABLE 2

Manage groups: the SAS/CBSD sends this command in order to add/remove entities to/from a group with a specific id. Example syntax: groupManage(groupLevel, action, groupID, userID/cbsdID, userMACaddress/cbsdMACaddress).

| Parameter Name | Data Type | Description |
|---|---|---|
| groupLevel | 'SAS' or 'CBSD' | The entity that enforces the grouping (it can be either SAS to CBSD or CBSD to its users) |
| groupAction | String {"add", "rmv", "end"} | The action that is applied by the SAS/CBSD to the group add→a CBSD/user is added to the group rmv→a CBSD/user is removed from the group end→ the group is terminated |
| groupID | String | A unique identifier for each group of CBSDs |
| userID | String | A unique identifier for a CBSD user -required only in case of "add/rmv" actions |
| cbsdID | String | A unique identifier for each CBSD registered to SAS - required only in case of "add/rmv" actions |
| userMACaddr | Number | The MAC address of the CBSD user - required only in case of "add/rmv" actions |
| cbsdMACaddr | Number | The MAC address of the registered CBSDs - required only in case of "add/rmv" actions |

In the following, Examples of Spectrum Usage Commands are described. The second set of commands refers to enforcement of spectrum usage actions (i.e. stop band etc.) and it includes two different cases. In the first case, the SAS fully terminates the access of a CBSD to a specific band (e.g. in case the incumbent has to use the channel and there is not another available channel for the CBSD). In the second one, the SAS modifies the current CBSDs' transmissions so as to prevent any interference with the incumbent user (e.g. SAS changes the channel of the low-priority users, eliminate the power etc.).

In order to terminate the access/transmission of a CBSD to a specific band, the SAS can select among a set of different strategies and the corresponding commands according to Tables 3 and 4 shown below:

TABLE 3

Enforcement of sleep mode to the CBSDs (APs): the SAS sends this command to enforce either a specific CBSD (cbsdID) or a group of CBSDs (groupID) to enter in sleep mode and stop the transmission. Example syntax: sleepEnforce(cbsdID/groupID, termEvent, endtime).

| Parameter Name | Data Type | Description |
|---|---|---|
| cbsdID | String | A unique identifier for each CBSD registered to SAS |
| groupID | String | A unique identifier for each group of CBSDs |
| termEvent | String {"trigger", "time"} | The event that terminates the sleep mode of the CBSDs. If termEvent = trigger → another command (sleepStop) is needed to terminate the sleep mode If termEvent = time→ sleep mode is terminated at the X (where x is given by endtime parameter) |
| endtime | Number | Timestamp that refers to the termination of the sleep mode - Required only if termEvent = time |

TABLE 4

Termination of sleep mode for the CBSDs (APs): the SAS sends this command to terminate the sleep mode either for a specific CBSD (cbsdID) or a group of CBSDs (groupID). Example syntax: sleepStop(cbsdID/groupID).

| Parameter Name | Data Type | Description |
|---|---|---|
| cbsdID | String | A unique identifier for each CBSD registered to SAS |
| groupID | String | A unique identifier for each group of CBSDs |

Instead of sleep-mode enforcement, the SAS can also use a set of alternative techniques to block/unblock CBSDs (APs) based on specific parameters (e.g. MAC/IP address, application, content etc.) as shown in Table 5 below.

TABLE 5

The SAS can also use a set of alternative techniques to block/unblock CBSDs (APs) based on specific parameters (e.g. MAC/IP address, application, content etc.) Example syntax: blockCBSD(action, blockParam, blockValue).

| Parameter Name | Data Type | Description |
|---|---|---|
| action | String {"block", "unblock"} | The action that is enforced to CBSDs |
| blockParam | String {"IPaddr", | The parameter that is checked by the SAS in order to block specific CBSDs |

TABLE 5-continued

The SAS can also use a set of alternative techniques to block/unblock CBSDs (APs) based on specific parameters (e.g. MAC/IP address, application, content etc.) Example syntax: blockCBSD(action, blockParam, blockValue).

| Parameter Name | Data Type | Description |
|---|---|---|
| | "MACaddr", "protocol", "app"} | If blockParam = IPaddr/MACaddr → CBSDs with specific IP/MAC addresses (defined in blockValue) are blocked. If blockParam = protocol/app → CBSDs that run specific protocols/apps (defined in blockValue) are blocked |
| blockValue | String | The values of the blockParameter that are blocked |

Instead of fully terminating the access of a CBSD to a given band, the following alternative strategies may be employed in order to eliminate the caused interference to incumbent user. The first alternative as shown in Table 6 is channel change and the second alternative strategy as shown in Table 7 is output power modification.

TABLE 6

Channel change: the SAS sends this command in order to enforce specific CBSDs to "hop" to another available channel. Example syntax: channelChange(cbsdID, channelTgt).

| Parameter Name | Data Type | Description |
|---|---|---|
| cbsdID | String | A unique identifier for each CBSD registered to SAS |
| channelTgt | Number | The target channel to which the CBSD is forced to hop |

TABLE 7

Output power modification: the SAS sends this command in order to modify the transmission power of specific CBSDs. Example syntax: powerModify(cbsdID, maxpower).

| Parameter Name | Data Type | Description |
|---|---|---|
| cbsdID | String | A unique identifier for each CBSD registered to SAS. |
| Maxpower | Number | The maximum transmission power level (dBm/MHz) of the CBSD |

Figure 5:
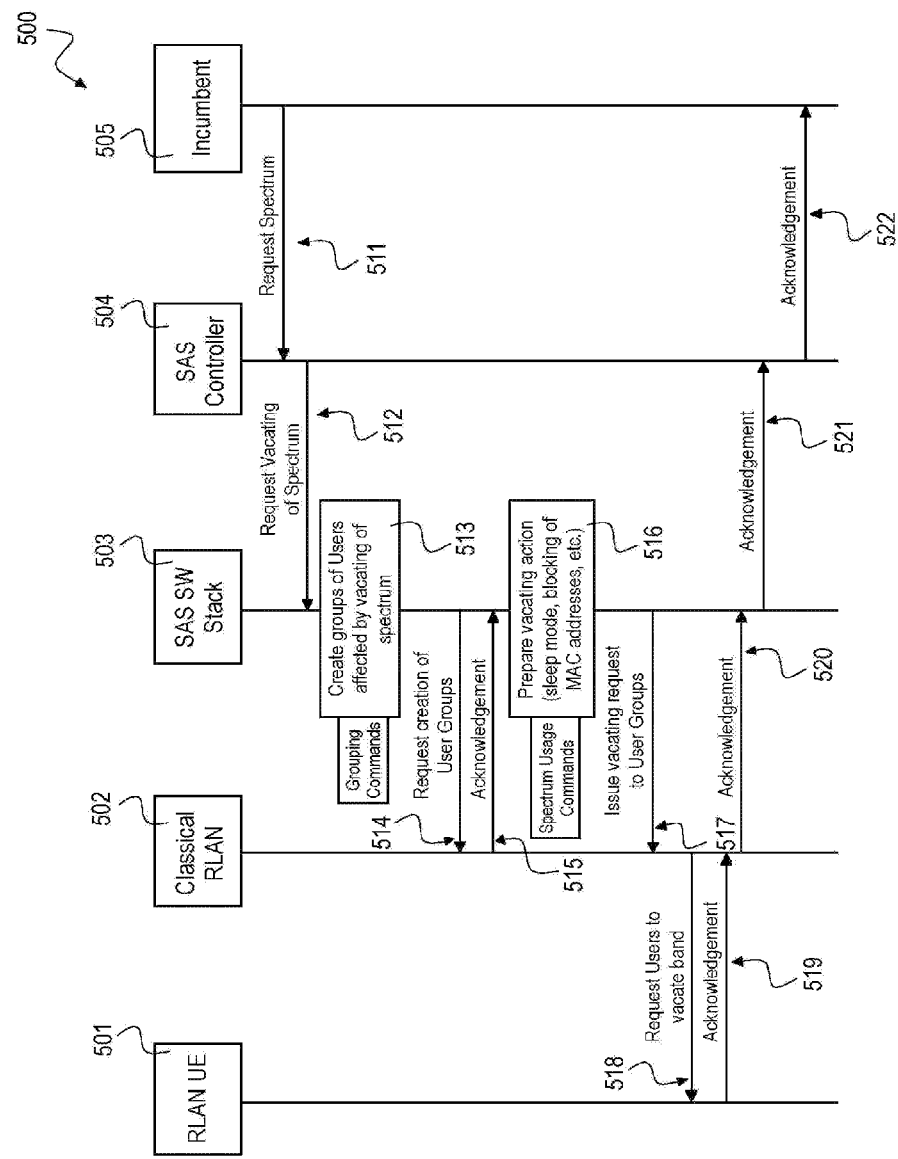
FIG. 5 is an exemplary message sequence chart illustrating an exemplary messaging 500 between SAS entities according to the disclosure when an Incumbent arrives.

FIG. 5 is an exemplary message sequence chart illustrating an exemplary messaging 500 between SAS entities according to the disclosure when an Incumbent arrives. In FIG. 5, the following network entities are depicted: RLAN UE 511, (classical) RLAN component 512, SAS Software (SW) Stack 513, SAS Controller 514 and Incumbent 515.

The SAS SW stack 503 that may be implemented in the RLAN component 502 for example can execute the following sequence of commands as soon as an incumbent 515 arrives—as can be seen from FIG. 5: 1) Receive shut-down request from SAS Controller (based on the metrics->from project slides); 2) SAS-Stack Creates suitable User Groups; 3) Enforce sleep mode for specific User Groups; 4) Receive trigger from SAS Controller to terminate sleep mode; and 5) Execute termination of sleep mode through AP commands.

In the Example illustrated in FIG. 5, the message sequence may be as follows: The incumbent 505 transmits "Request Spectrum" message 511 to the SAS controller 504 to indicate that spectrum is required by incumbent 505. The SAS controller 504 transmits "Request Vacating of Spectrum" message 512 to SAS SW stack 503 to indicate that spectrum is required by incumbent 505. In the SAS SW stack 503 groups of users affected by vacating of spectrum are created 513. Then, SAS SW stack 503 transmits "request creation of user groups" message 514 to RLAN 502 to request for creation of user groups. RLAN 502 answers with Acknowledgement 515. The SAS SW stack 503 then prepares for vacating action (e.g. sleep mode, blocking of MAC addresses, etc.) 516 and transmits message "issue vacating request to user groups" to RLAN 502 to inform RLAN 502 about vacating request to user groups. RLAN 502 transmits message "request users to vacate band" 518 to RLAN UE 501 to inform specific users about vacating request. RLAN UE 501 answers with Acknowledgement 519. Then, RLAN 502 transmits Acknowledgement 520 to SAS SW stack 503 which transmits Acknowledgement 521 to SAS controller 504 which transmits Acknowledgement 522 to Incumbent 505.

Figure 6:
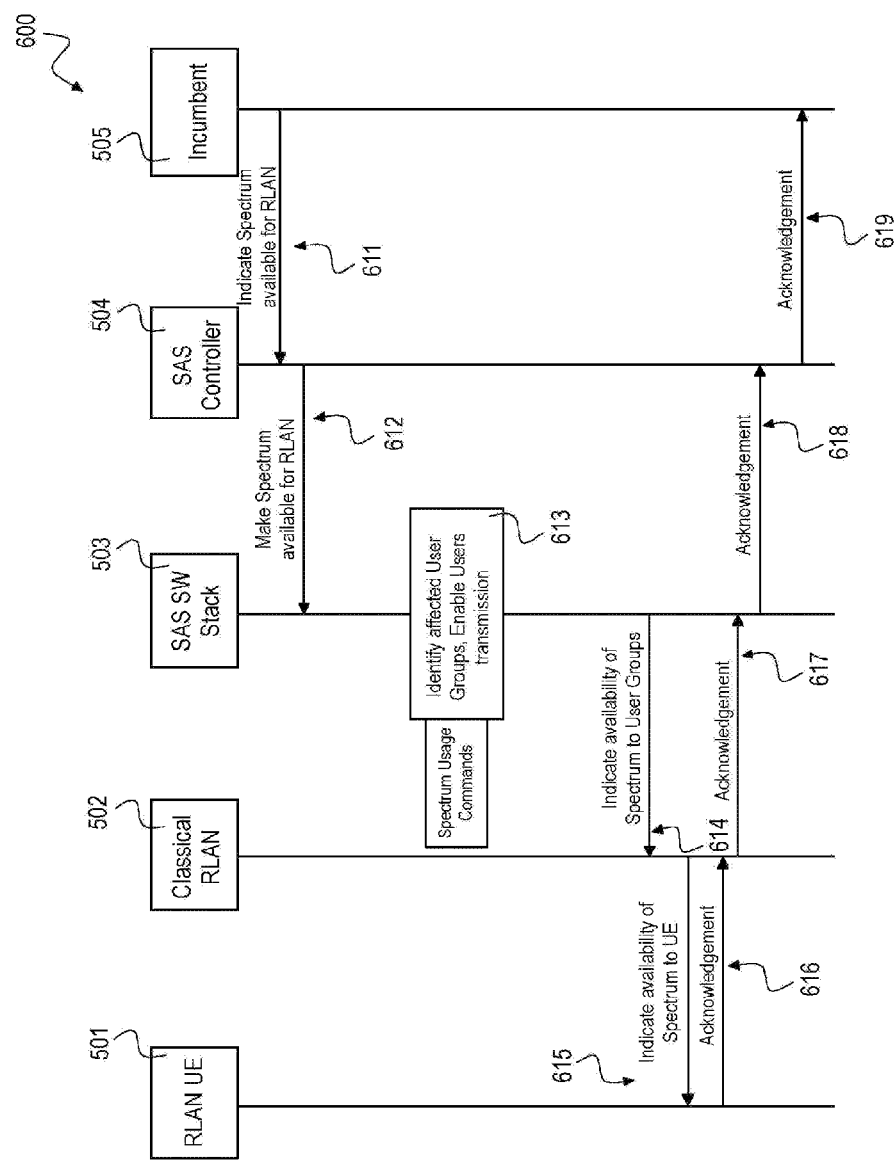
FIG. 6 is an exemplary message sequence chart illustrating an exemplary messaging 600 between SAS entities according to the disclosure when the Incumbent does not require the spectrum resource any more.

FIG. 6 is an exemplary message sequence chart illustrating an exemplary messaging 600 between SAS entities according to the disclosure when the Incumbent does not require the spectrum resource any more. In FIG. 6, the same network entities as shown in FIG. 5 are depicted: RLAN UE 511, (classical) RLAN component 512, SAS Software (SW) Stack 513, SAS Controller 514 and Incumbent 515. As soon as the incumbent does not need the spectrum resource any more, the RLANs are triggered again and can use spectrum again as illustrated in FIG. 6.

In the Example illustrated in FIG. 6, the message sequence may be as follows: The incumbent 505 transmits "Indicate Spectrum available for RLAN" message 611 to the SAS controller 504 to indicate that spectrum is available again.

The SAS controller 504 transmits "make spectrum available to RLAN" message 612 to SAS SW stack 503 to indicate that spectrum shall be made available for RLAN 502. In the SAS SW stack 503 affected user groups are identified and users transmission is enabled 613. Then, SAS SW stack 503 transmits "indicate availability of spectrum to user groups" message 614 to RLAN 502 to indicate RLAN 502 of availability of spectrum to user groups. RLAN 502 transmits "indicate availability of spectrum to UE" message 615 to RLAN UE 501 to indicate the specific RLAN UE 501 about availability of spectrum. RLAN UE 501 answers with Acknowledgement 616. Then, RLAN 502 transmits Acknowledgement 617 to SAS SW stack 503 which transmits Acknowledgement 618 to SAS controller 504 which transmits Acknowledgement 619 to Incumbent 505.

The techniques disclosed above with respect to FIGS. 1 to 6, in particular the use of the above commands described with respect to FIGS. 5 and 6 can also be applied to provide specific guarantees in case that multiple secondary systems need to share access to the band (for example systems such as WiFi and MuLTEFire existing in the same band) so as to ensure their harmonious co-existence, e.g. as described in the following.

Initially, the SAS Controller will require medium access budget requirements from the secondary systems in order to manage the spectral resources and allow access to the corresponding bands (e.g. MuLTEfire/WiFi APs will provide required resource requests). The requirements can be expressed in terms of bandwidth share, throughput (e.g. minimum throughput), application types (e.g., social media, personal email, youtube, etc.) or other performance requests.

To ensure truthfulness of the secondary systems and guarantee utilization and fairness of the spectrum distribution among the different systems, different incentive and allocation mechanisms can be used. A simple approach is to introduce a penalty to the secondary systems that do not completely use the allocated resources to prevent them from requesting for the entire bandwidth. Other approaches that can be used include auction-based mechanisms [4] or market-based approaches. For example, the required information that the CBSDs have to send to the SAS can be proportional to their resource requests. Hence, little additional information is required in case of low resource requests (e.g., a 1% resource request is granted easily) whereas more information is required for high resource requests (e.g., a 99% resource request required detailed information on application types, etc.).

Based on the requests, the SAS can assign the CBSDs to specific groups using the defined Grouping commands. In case of congestion or co-existence issues, the SAS Controller will determine an adequate time-sharing scheme for each group in order to maximize spectrum utilization and minimize congestion issues. Based on this scheme, the SAS Controller informs the respective SAS stack so as to enforce the time-sharing scheme by using the Spectrum Usage commands that are defined above. This way, the SAS can block the transmission of specific groups (either forcing sleep mode or using an alternative strategy) for a specific time duration so as different groups of CBSDs to be active/inactive during non-overlapping time windows (see FIG. 7). The goal is to move the system operating point from a low efficiency state to a high efficiency state, eliminating the traffic load.

The upper approach thus exploits the SAS Controller to manage resource sharing between multiple distinct technologies (such as WiFi/MuLTEfire).

Figure 7:
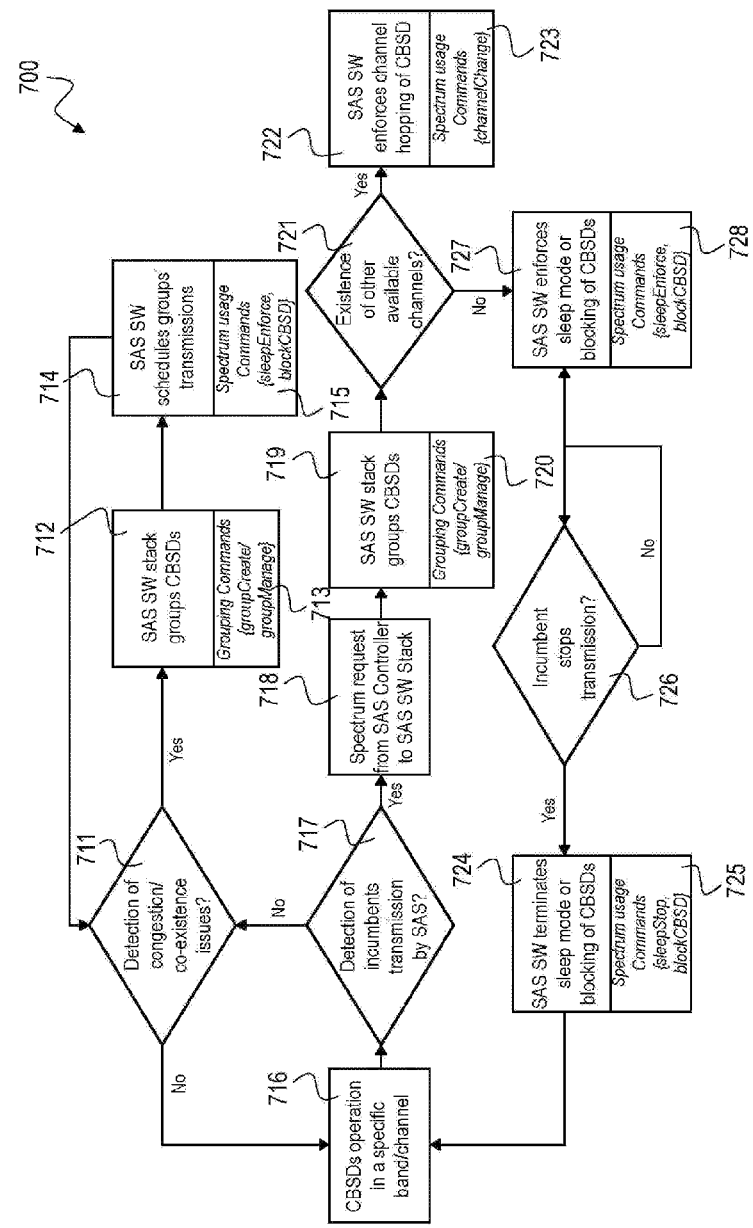
FIG. 7 is schematic diagram illustrating an exemplary workflow 700 for the operation of Citizen Broadband Radio System (CBRS) tier-3 users according to the disclosure.

FIG. 7 is schematic diagram illustrating an exemplary workflow 700 for the operation of CBRS tier-3 users according to the disclosure.

The workflow 700 in FIG. 7 illustrates the sequence of SAS and CBSDs' actions in case of incumbent detection as well as in case of congestion/co-existence issues due to multiple secondary technologies' co-existence. The diagram in FIG. 7 also indicates the use of the corresponding commands for the SAS SW to RLAN interaction at each step.

The workflow 700 includes the following: In a first block 711 a detection is performed if congestion and/or co-existence issues exist. If yes, in a second block 712, SAS SW stack groups CBSDs. Grouping commands are applied 713, e.g. groupCreate and/or groupManage as described above. Then, in a third block 714 SAS SW schedules groups' transmissions. Spectrum usage commands are applied 715, e.g. sleepEnforce, blockCBSD. After third block 714 first block 711 is performed again. If answer of first block 711 detection is no, fourth block 716 is performed, where CBSDs operation is in a specific band and/or channel. Then, in fifth block 717 detection of incumbent's transmission by SAS is performed. If no, first block 711 is performed again. If yes, sixth block 718 is performed in which spectrum request from SAS Controller to SAS SW stack is transmitted, e.g. as described above with respect to FIGS. 5 and 6. Then, in a seventh block 719, SAS SW stack groups CBSDs, e.g. as described above. Grouping commands are applied 720, e.g. groupCreate and/or groupManage as described above.

Then, in eighth block 721 existence of other available channels is checked. If answer is yes, in ninth block 722 SAS SW enforces channel hopping of CBSD. Spectrum usage commands are applied 723, e.g. channelChange as described above. If answer of eighth block 721 is no, in tenth block 727, SAS SW enforces sleep mode or blocking of CBSDs. Spectrum usage commands are applied 728, e.g. sleepEnforce, blockCBSD as described above. SAS SW enforces sleep mode or blocking of CBSDs as long as incumbent does not stop transmission 726. If Incumbent stops transmission 726, in an eleventh block 724 SAS SW terminates sleep mode or blocking of CBSDs. Spectrum usage commands are applied 725, e.g. sleepStop and blockCBSD as described above.

Figure 8:
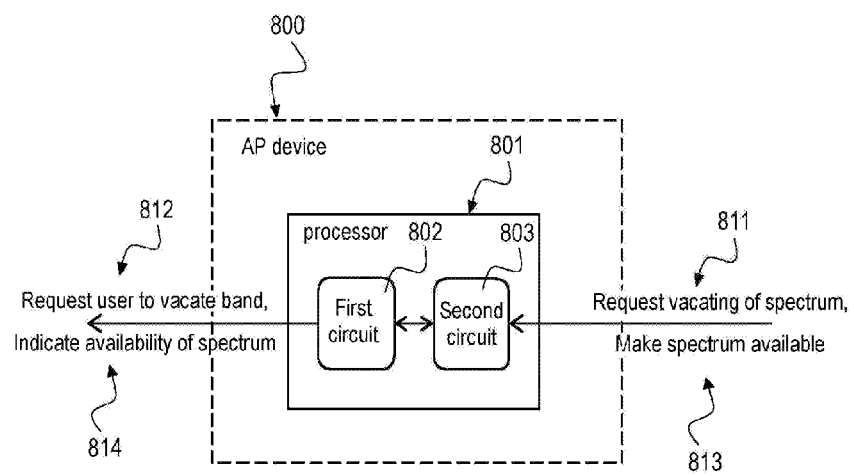
FIG. 8 is an exemplary access point (AP) device 800 according to the disclosure.

FIG. 8 is an exemplary access point (AP) device 800 according to the disclosure. The AP device may control spectrum usage of a hierarchical communication system, in which a spectrum reserved for an Incumbent is usable by at least one user equipment (UE) for transmission when the spectrum is not required by the Incumbent, e.g. as described above with respect to FIGS. 4 to 7. The AP device 800 includes a processor 801. The processor 801 is configured to enforce the at least one UE into a mode protecting use of the spectrum by the Incumbent (e.g. by transmitting message "request user to vacate band" 812) based on a spectrum request indication (e.g. message "request vacating of spectrum" 811) from the Incumbent, e.g. as described above with respect to FIGS. 4 to 7. The processor 801 is further configured to enable transmission of the at least one UE using the spectrum reserved for the Incumbent (e.g. by transmitting message "indicate availability of spectrum" 814) based on a spectrum availability indication from the Incumbent (e.g. message "make spectrum available" 813).

The AP device 800 may correspond to the RLAN component 502 with SAS SW stack 503 depicted in FIGS. 5 and 6 or to the AP device 400 depicted in FIG. 4 or to any of the base stations BS1, BS2 depicted in FIG. 2 or to any of the CBSD devices 111, 112, 113, 114 depicted in FIG. 1. The central controller may correspond to the SAS controller 504 depicted in FIGS. 5 and 6 or to the SAS Central Controller 440 depicted in FIG. 4 or to the SAS1 controller 131 or SAS2 controller 132 depicted in FIG. 1 or to the LSA Controller 213 depicted in FIG. 2 or to the central controller 900 depicted in FIG. 9. The UE may correspond to one of the user equipments 101, 102, 103 depicted in FIG. 1 or to the UE depicted in FIG. 2 or to the RLAN UE 501 depicted in FIGS. 5 and 6. The Incumbent may correspond to the Incumbent 505 depicted in FIGS. 5 and 6 or to one of the Incumbents 201, 202, 203 shown in FIG. 2.

Note that the Incumbent according to this disclosure may also represent any device that has a higher priority for using the radio resources of the communication system than the UEs. For example the Incumbent may also represent a UE having a higher priority, for example by contract with a system operator.

The AP device 800 may include a network interface (right side of FIG. 8) with a controller of the hierarchical communication system, in particular a Spectrum Access System (SAS) controller or a Licensed Shared Access (LSA) system controller. The processor 801 may be configured to receive the spectrum request indication 811 and/or the spectrum availability indication 813 via the network interface.

Figure 9:
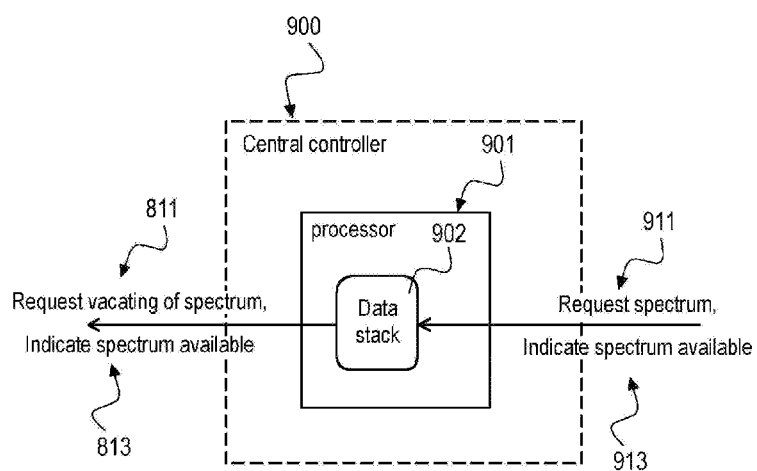
FIG. 9 is an exemplary central controller 900, e.g. an SAS controller according to the disclosure.

The processor 801 may receive a message 811 requesting vacating of the reserved spectrum from the controller of the hierarchical communication system, e.g. from the central controller 900 depicted in FIG. 9 upon a spectrum request indication from the Incumbent. The processor 801 may receive a message 813 making the reserved spectrum available for transmission of the at least one UE from the controller of the hierarchical communication system upon a spectrum availability indication from the Incumbent, e.g. as described above with respect to FIGS. 5 and 6.

The AP device 800 may further include a user interface (left side of FIG. 8) with the at least one UE, in particular at least one RLAN UE. The processor 801 may be configured to transmit a message 812 enforcing the at least one UE into the mode protecting use of the spectrum by the Incumbent via the user interface to the at least one UE. The processor 801 may be configured to transmit a message 814 enabling transmission of the at least one UE using the reserved spectrum via the user interface to the at least one UE.

The processor 801 may create groups of users affected by the spectrum request indication from the Incumbent. The processor 801 may prepare vacating action to the affected groups of users, in particular vacating action comprising sleep mode and/or blocking of MAC addresses. The processor 801 may transmit a message requesting users to vacate the reserved spectrum to UEs belonging to the affected groups of users. The processor 801 may identify groups of users affected by the enforcement into the mode protecting use of the spectrum by the Incumbent based on the spectrum availability indication from the Incumbent, e.g. as described above with respect to FIGS. 5 and 6. The processor 801 may transmit a message indicating availability of the reserved spectrum to UEs belonging to the affected groups of users, e.g. as described above with respect to FIGS. 5 and 6.

The AP device 800 may include a first application programming circuitry 802 configured to control the at least one UE. The AP device 800 may include a second application programming circuitry 803 comprising an interface with the first application programming circuitry 802. The second application programming circuitry 803 may interact with a central controller of the hierarchical communication system in order to allow the central controller take over control of the at least one UE via the interface with the first application programming circuitry 802, e.g. as described above with respect to FIG. 4.

The first application programming circuitry 802 may correspond to the WiFi Stack 300 described above with respect to FIG. 4. The second application programming circuitry 803 may correspond to the additional SAS WiFi Stack 420 described above with respect to FIG. 4.

The first application programming circuitry 802 may be coupled to the at least one UE via a decentralized wireless communication network, in particular via a WiFi network. The second application programming circuitry 803 may interact with the first application programming circuitry 802 via a first external application programming interface (API) 417 as shown in FIG. 4. The second application programming circuitry 803 may interact with the central controller 440 via a second external application programming interface (API) 424 as shown in FIG. 4.

The second application programming circuitry 803 may comprise a data stack 422 configured to interact with a corresponding data stack 442 of the central controller 440 via the second external API. The first application programming circuitry 802 may comprise a WiFi stack. The second application programming circuitry 803 may be coupled via an Internet Protocol (IP) interface 424 with the central controller 440 of the hierarchical communication system as shown in FIG. 4.

FIG. 9 is a block diagram illustrating an exemplary central controller 900, e.g. an SAS controller according to the disclosure.

The central controller 900 is a controller of a hierarchical communication system, in which a spectrum reserved for an Incumbent is usable by at least one user equipment (UE) for transmission when the spectrum is not required by the Incumbent, e.g. as described above with respect to FIGS. 4 to 9. The central controller 900 comprises a processor 901.

The processor 901 is configured to indicate an access point (AP) device (connected at the left side of FIG. 9 with the AP device 900) to enforce the at least one UE into a mode protecting use of the spectrum by the Incumbent (e.g. via message "request vacating of spectrum" 811 depicted in FIG. 9) based on a spectrum request indication 911 from the Incumbent (arriving from an Incumbent at the right side of FIG. 9).

The processor 901 is further configured to indicate the AP device to enable transmission of the at least one UE using the spectrum reserved for the Incumbent Incumbent (e.g. via message "make spectrum available" 813 depicted in FIG. 9) based on a spectrum availability indication 913 from the Incumbent.

The central controller 900 may correspond to the SAS controller 504 depicted in FIGS. 5 and 6 or to the SAS Central Controller 440 depicted in FIG. 4 or to the SAS1 controller 131 or SAS2 controller 132 depicted in FIG. 1 or to the LSA Controller 213 depicted in FIG. 2. The Incumbent may correspond to the Incumbent 505 depicted in FIGS. 5 and 6 or to one of the Incumbents 201, 202, 203 shown in FIG. 2. The AP device may correspond to the RLAN component 502 with SAS SW stack 503 depicted in FIGS. 5 and 6 or to the AP device 400 depicted in FIG. 4 or to any of the base stations BS1, BS2 depicted in FIG. 2 or to any of the CBSD devices 111, 112, 113, 114 depicted in FIG. 1 or to the AP device 800 depicted in FIG. 8. The UE may correspond to one of the user equipments 101, 102, 103 depicted in FIG. 1 or to the UE depicted in FIG. 2 or to the RLAN UE 501 depicted in FIGS. 5 and 6.

The central controller 900 may include a Spectrum Access System (SAS) controller or a Licensed Shared Access (LSA) system controller as described above with respect to FIGS. 1 and 2.

The central controller 900 may include a network interface (right side of FIG. 9) with the Incumbent. The processor 901 may receive the spectrum request indication 911 from the Incumbent via the network interface.

The processor 901 may transmit a message 811 requesting vacating of the reserved spectrum to the AP device upon the spectrum request indication 911 from the Incumbent. The processor 901 may transmit a message 813 making the reserved spectrum available for transmission of the at least one UE upon the spectrum availability indication 913 from the Incumbent.

Figure 10:
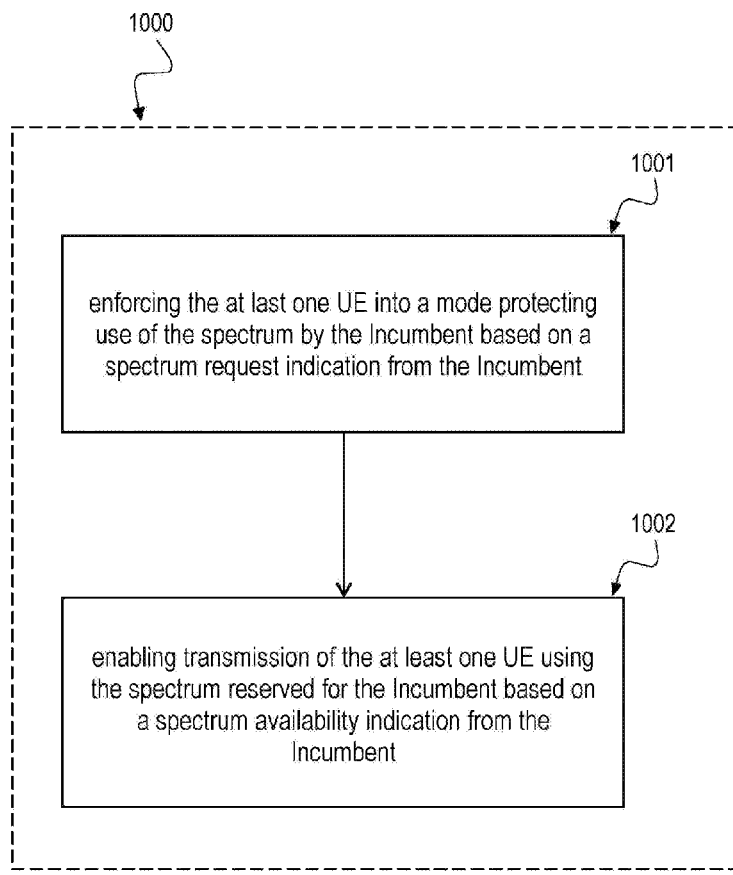
FIG. 10 is schematic diagram illustrating a method 1000 for controlling spectrum usage of a hierarchical communication system according to the disclosure.

FIG. 10 is schematic diagram illustrating a method 1000 for controlling spectrum usage of a hierarchical communication system according to the disclosure. In the hierarchical communication system a spectrum reserved for an Incumbent is usable by at least one user equipment (UE) for transmission when the spectrum is not required by the Incumbent, e.g. as described above with respect to FIGS. 5 to 7. The method 1000 includes enforcing 1001 the at least one UE into a mode protecting use of the spectrum by the Incumbent based on a spectrum request indication from the Incumbent, e.g. as described above with respect to FIGS. 4 to 9. The method 1000 further includes enabling 1002 transmission of the at least one UE using the spectrum reserved for the Incumbent based on a spectrum availability indication from the Incumbent, e.g. as described above with respect to FIGS. 4 to 9.

The method 1000 may further comprise: receiving the enforcing and/or the enabling from a controller of the hierarchical communication system, in particular a Spectrum Access System (SAS) controller or a Licensed Shared Access (LSA) system controller, e.g. as described above with respect to FIGS. 4 to 9.

The method 1000 may further comprise: receiving a message requesting vacating of the reserved spectrum from the controller of the hierarchical communication system upon a spectrum request indication from the Incumbent; and receiving a message making the reserved spectrum available for transmission of the at least one UE from the controller of the hierarchical communication system upon a spectrum availability indication from the Incumbent, e.g. as described above with respect to FIGS. 4 to 9.

The method 1000 may further include: transmitting a message enforcing the at least one UE into the mode protecting use of the spectrum by the Incumbent to the at least one UE; and transmitting a message enabling transmission of the at least one UE using the reserved spectrum to the at least one UE, e.g. as described above with respect to FIGS. 4 to 9.

The method 1000 may further include: creating groups of users affected by the spectrum request indication from the Incumbent, e.g. as described above with respect to FIGS. 4 to 9.

The method 1000 may further include: preparing vacating action to the affected groups of users, in particular vacating action comprising sleep mode and/or blocking of MAC addresses.

The method 1000 may further include: transmitting a message requesting users to vacate the reserved spectrum to UEs belonging to the affected groups of users, e.g. as described above with respect to FIGS. 4 to 9.

The method 1000 may further include: identifying groups of users affected by the enforcement into the mode protecting use of the spectrum by the Incumbent based on the spectrum availability indication from the Incumbent, e.g. as described above with respect to FIGS. 4 to 9.

The method 1000 may further include: transmitting a message indicating availability of the reserved spectrum to UEs belonging to the affected groups of users, e.g. as described above with respect to FIGS. 4 to 9.

The method 1000 may further include: controlling the at least one UE by a first application programming circuitry; and interacting by a second application programming circuitry with a central controller of the hierarchical communication system in order to allow the central controller take over control of the at least one UE via the first application programming circuitry, e.g. as described above with respect to FIGS. 4 to 9.

The method 1000 may include the functionalities as described above with respect to FIGS. 4 to 9 and may be performed by a processor, e.g. a processor on which the functionalities as described above with respect to FIGS. 4 to 9 are implemented as APIs.

Figure 11:
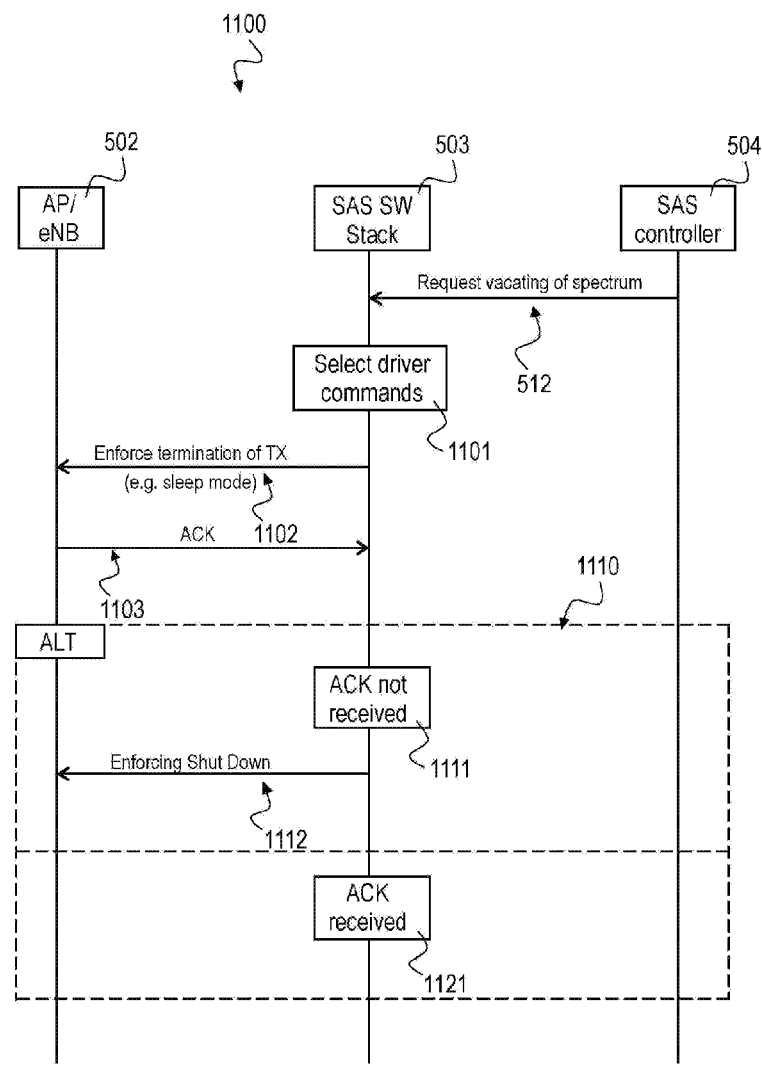
FIG. 11 is an exemplary message sequence chart illustrating an exemplary messaging 1100 between SAS entities according to the disclosure when an Incumbent arrives.

FIG. 11 is an exemplary message sequence chart illustrating an exemplary messaging 1100 of an interface between SAS SW stack 503 and AP/eNB 502 according to the disclosure. The message sequence chart gives examples for messages on the interface 417 between additional SAS WiFi stack 420 and WiFi stack 300 according to FIG. 4 that may be implemented as external API interface as shown in FIG. 4.

An exemplary messaging on the interface 424 between SAS central controller 440 and additional SAS WiFi stack 420 is also shown in FIG. 11. The SAS controller 504 transmits a message "request vacating of spectrum" 512 to the SAS SW stack 503 which selects driver commands based on the received message 512, e.g. according to the description with respect to FIG. 4. For example an enforcing of sleep mode command is selected. The SAS SW stack 503 then transmits message "enforce termination of TX" 1102 with the selected driver command, e.g. sleep mode to AP/eNB 502 which answers with ACK 1103. In section 1110 of the message chart 1100 alternatives are depicted. If ACK is not received 1111, the SAS SW stack 503 may transmit message "enforce shut Down" 1112 to AP/eNB 502 in order to unconditionally shut down the respective UEs of AP/eNB 502. If ACK is received 1121, SAS SW stack 503 is not required to transmit further messages to AP/eNB 502.

In an exemplary implementation, the SAS controller 504 may assign time slots to communication of UEs when using the spectrum reserved for the Incument. For example, each UE may have a time of 200 milliseconds for transmission in the reserved frequency band.

The SAS controller 502 may schedule different systems of different structure, for example systems of different RAT (radio access technology), etc. For example, different AP/eNBs 502 may be controlled by the SAS controller 504. One AP, for example, does not support all commands transmitted by SAS controller 504. In this case, the AP 502 may use an alternative command that is next to the transmitted command. For example, if sleep mode is not supported, AP can perform a power shutdown. The AP may have proprietary commands that are similar to the commands sent by SAS SW stack 503. In this case, AP can select a proprietary command that is similar or most similar to the command transmitted by SAS SW stack 503.

The disclosure also presents a user equipment (UE), e.g. a UE 101, 102, 103 as shown in FIG. 1 or a UE as shown in FIG. 2 or an RLAN UE 501 as shown in FIGS. 5 and 6, operating in a hierarchical communication system, in which a spectrum reserved for an Incumbent is usable by the UE for transmission when the spectrum is not required by the Incumbent. The UE comprises a processor that is configured to switch the UE into a mode protecting use of the spectrum by the Incumbent based on a handover request to a first frequency band from a network device, e.g. a citizen broadband radio system (CBRS). The handover request may result from a spectrum request indication from the Incumbent. The processor is further configured to enable transmission of the UE using the spectrum reserved for the Incumbent based on a handover request to a second frequency band from the network device, e.g. the CBRS. The second frequency band may include at least part of the spectrum reserved for the Incumbent. Note that in LSA, the incumbent may actively issue itself a spectrum request indication. In SAS, however, the Incumbent is typically not interacting with the SAS system, rather the SAS system has to detect that the Incumbent is in need to take back the spectrum. So, the trigger is finally not coming from the Incumbent itself but from a detection (sensing) circuitry in the SAS system. Hence, the handover request to the first frequency band is encompassing both. Also, the UE is typically not involved in the management/detection of such a trigger—this is only handled within the CBSDs. The handover request may come from the CBSDs, but the trigger itself is invisible, i.e. transparent to the UE. For the handover request to the second frequency, the same comments hold true, i.e. the trigger is transparent for the UE since it is managed at the CBSD level only. The UE only has received a handover (H/O) request to another band (which can be seen as an indirect indication of such a trigger).

The UE may comprise a communication interface with an Access Point (AP) device, e.g. an AP device 800, 502, 400, BS1, BS2, 111, 112, 113, 114 as shown in FIGS. 8, 5, 6, 4, 1, 2. The processor may receive the handover request to the first frequency band, e.g. a spectrum request indication and/or the handover request to the second frequency band, e.g. a spectrum availability indication via the communication interface from the AP device. The processor may switch the UE into a sleep mode upon receiving the handover request to the first frequency band from the AP device and may terminate the sleep mode upon receiving the handover request to the second frequency band from the AP device.

In an exemplary implementation of the UE, the UE receives information about times at which the reserved frequency band is not available to transmission by the Incumbent. The UE may further receive information about which services are available in which frequency bands.

The UE may further receive information about frequencies, services, service classes, e.g. safety-related and/or non-safety-related, priorities, RATs, user groups, QoS, QoS dependent latency, block error rates (BLER), packet error rates of the respective frequency bands.

In an exemplary implementation of the UE, the UE may transmit measurement data to the SAS controller 504 via AP device 502 and/or SAS SW stack 503, for example sensing data, measurements about QoS levels of the reserved frequencies used by the UE. These measurement data may be used by the SAS controller 504 to decide which frequencies should by allocated to which UEs at what times. The SAS controller 504 may for example switch off some APs for which errors have been detected based on the measurement data from UEs.

In an exemplary implementation of the UE, the UE may transmit requirements via AP 502 and/or SAS SW stack 503 to SAS controller 504, e.g. which QoS is required by UE, which error rates are tolerable by UE. The SAS controller 504 may configure the respective APs according to the requirements from UEs. For example, the SAS controller 504 may prioritize the UEs and may divide UEs in hierarchical groups. Access to specific APs may be allowed only for UEs belonging to specific hierarchical groups or having a specific priority. For example only UEs of the same hierarchy level or a lower or higher hierarchy level may be allowed to access specific APs.

In an exemplary implementation these requirements from the UEs may be directly transmitted to SAS controller 504, e.g. tunneled via SAS SW stack 503. For example, UE1 has specific QoS requirements to the network and SAS controller 504 configures the network so to fulfill the requirements of UE1.

In an exemplary implementation, the RLAN system can include mobile edge computing nodes. In an exemplary implementation, UEs may form a fog network, e.g. a distributed fog network. These UEs may inform the SAS controller about their requirements.

In an exemplary implementation, the UE may be able to perform device-to-device (D2D) communication. In this scenario, the SAS SW stack 503 may be implemented in the UE which is able to communicate directly with the SAS controller 504 by traversing the AP 502. Then the UE may perform AP functionality for other UEs.

The methods, systems and devices described herein may be implemented as software in a Digital Signal Processor (DSP), in a micro-controller or in any other side-processor or as hardware circuit on a chip or within an application specific integrated circuit (ASIC).

Aspects described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 1000 as described above with respect to FIG. 10 and the techniques described with respect to FIGS. 4 to 9. Such a computer program product may include a readable storage medium storing program code thereon for use by a processor, the program code comprising instructions for performing any of the methods as described above.

EXAMPLES

The following examples pertain to further aspects. Example 1 is an access point (AP) device for controlling spectrum usage of a hierarchical communication system, in which a spectrum reserved for an Incumbent is usable by at least one user equipment (UE) for transmission when the spectrum is not required by the Incumbent, the AP device comprising a processor configured to: enforce the at least one UE into a mode protecting use of the spectrum by the Incumbent based on a spectrum request indication from the Incumbent; and enable transmission of the at least one UE using the spectrum reserved for the Incumbent based on a spectrum availability indication from the Incumbent.

In Example 2, the subject matter of Example 1 can optionally include: a network interface with a controller of the hierarchical communication system, in particular a Spectrum Access System (SAS) controller or a Licensed Shared Access (LSA) system controller, wherein the processor is configured to receive the spectrum request indication and/or the spectrum availability indication via the network interface.

In Example 3, the subject matter of Example 2 can optionally include that the processor is configured to: receive a message requesting vacating of the reserved spectrum from the controller of the hierarchical communication system upon a spectrum request indication from the Incumbent; and receive a message making the reserved spectrum available for transmission of the at least one UE from the controller of the hierarchical communication system upon a spectrum availability indication from the Incumbent.

In Example 4, the subject matter of any one of Examples 1-3 can optionally include a user interface with the at least one UE, in particular at least one RLAN UE, wherein the processor is configured to transmit a message enforcing the at least one UE into the mode protecting use of the spectrum by the Incumbent via the user interface to the at least one UE; and wherein the processor is configured to transmit a message enabling transmission of the at least one UE using the reserved spectrum via the user interface to the at least one UE.

In Example 5, the subject matter of any one of Examples 1-4 can optionally include that the processor is configured to create groups of users affected by the spectrum request indication from the Incumbent.

In Example 6, the subject matter of Example 5 can optionally include that the processor is configured to prepare vacating action to the affected groups of users, in particular vacating action comprising sleep mode and/or blocking of MAC addresses.

In Example 7, the subject matter of any one of Examples 5-6 can optionally include that the processor is configured to transmit a message requesting users to vacate the reserved spectrum to UEs belonging to the affected groups of users.

In Example 8, the subject matter of any one of Examples 1-7 can optionally include that the processor is configured to identify groups of users affected by the enforcement into the mode protecting use of the spectrum by the Incumbent based on the spectrum availability indication from the Incumbent.

In Example 9, the subject matter of Example 8 can optionally include that the processor is configured to transmit a message indicating availability of the reserved spectrum to UEs belonging to the affected groups of users.

In Example 10, the subject matter of any one of Examples 1-9 can optionally include: a first application programming circuitry configured to control the at least one UE; and a second application programming circuitry comprising an interface with the first application programming circuitry, wherein the second application programming circuitry is configured to interact with a central controller of the hierarchical communication system in order to allow the central controller take over control of the at least one UE via the interface with the first application programming circuitry.

In Example 11, the subject matter of Example 10 can optionally include that the first application programming circuitry is coupled to the at least one UE via a decentralized wireless communication network, in particular via a WiFi network.

In Example 12, the subject matter of any one of Examples 10-11 can optionally include that the second application programming circuitry is configured to interact with the first application programming circuitry via a first external application programming interface (API).

In Example 13, the subject matter of any one of Examples 10-12 can optionally include that the second application programming circuitry is configured to interact with the central controller via a second external application programming interface (API).

In Example 14, the subject matter of Example 13 can optionally include that the second application programming circuitry comprises a data stack configured to interact with a corresponding data stack of the central controller via the second external API.

In Example 15, the subject matter of any one of Examples 10-14 can optionally include that the first application programming circuitry comprises a WiFi stack.

In Example 16, the subject matter of any one of Examples 10-15 can optionally include that the second application programming circuitry is coupled via an Internet Protocol (IP) interface with the central controller of the hierarchical communication system.

Example 17 is a central controller of a hierarchical communication system, in which a spectrum reserved for an Incumbent is usable by at least one user equipment (UE) for transmission when the spectrum is not required by the Incumbent, the central controller comprising a processor configured to: indicate an access point (AP) device to enforce the at least one UE into a mode protecting use of the spectrum by the Incumbent based on a spectrum request indication from the Incumbent; and indicate the AP device to enable transmission of the at least one UE using the spectrum reserved for the Incumbent based on a spectrum availability indication from the Incumbent.

In Example 18, the subject matter of Example 17 can optionally include a Spectrum Access System (SAS) controller or a Licensed Shared Access (LSA) system controller.

In Example 19, the subject matter of any one of Examples 17-18 can optionally include a network interface with the Incumbent, wherein the processor is configured to receive the spectrum request indication from the Incumbent via the network interface.

In Example 20, the subject matter of Example 19 can optionally include that the processor is configured to: transmit a message requesting vacating of the reserved spectrum to the AP device upon the spectrum request indication from the Incumbent; and transmit a message making the reserved spectrum available for transmission of the at least one UE upon the spectrum availability indication from the Incumbent.

Example 21 is a user equipment (UE) operating in a hierarchical communication system, in which a spectrum reserved for an Incumbent is usable by the UE for transmission when the spectrum is not required by the Incumbent, the UE comprising a processor configured to: switch the UE into a mode protecting use of the spectrum by the Incumbent based on a handover request to a first frequency band from a network device, in particular a citizen broadband radio system, CBRS; and enable transmission of the UE using the spectrum reserved for the Incumbent based on a handover request to a second frequency band from the network device.

In Example 22, the subject matter of Example 21 can optionally include a communication interface with an Access Point (AP) device, wherein the processor is configured to receive the handover request to the first frequency band and/or the second frequency band via the communication interface from the AP device.

In Example 23, the subject matter of Example 22 can optionally include that the processor is configured to switch the UE into a sleep mode upon receiving the handover request to the first frequency band from the AP device and to terminate the sleep mode upon receiving the handover request to the second frequency band from the AP device.

In Example 24, the subject matter any one of Examples 21-22 can optionally include that the handover request to the second frequency band indicates time slots at which the reserved spectrum is available for transmission for the UE.

In Example 25, the subject matter any one of Examples 21-22 can optionally include that the handover request to the second frequency band indicates services which are usable for the UE.

In Example 26, the subject matter any one of Examples 21-22 can optionally include that the processor is configured to determine a Quality-of-Service (QoS) of the reserved spectrum and to transmit the QoS to a central controller of the hierarchical communication system.

Example 27 is a method for controlling spectrum usage of a hierarchical communication system, in which a spectrum reserved for an Incumbent is usable by at least one user equipment (UE) for transmission when the spectrum is not required by the Incumbent, the method comprising: enforcing the at least one UE into a mode protecting use of the spectrum by the Incumbent based on a handover request to a first frequency band from a network device, in particular a CBRS; and enabling transmission of the at least one UE using the spectrum reserved for the Incumbent based on a handover request to a second frequency band from the network device.

In Example 28, the subject matter of Example 27 can optionally include: receiving the enforcing and/or the enabling from a controller of the hierarchical communication system, in particular a Spectrum Access System (SAS) controller or a Licensed Shared Access (LSA) system controller.

In Example 29, the subject matter of Example 28 can optionally include: receiving a message requesting vacating of the reserved spectrum from the controller of the hierarchical communication system; and receiving a message making the reserved spectrum available for transmission of the at least one UE from the controller of the hierarchical communication system.

In Example 30, the subject matter of any one of Examples 27-29 can optionally include: transmitting a message enforcing the at least one UE into the mode protecting use of the spectrum by the Incumbent to the at least one UE; and transmitting a message enabling transmission of the at least one UE using the reserved spectrum to the at least one UE.

In Example 31, the subject matter of any one of Examples 27-30 can optionally include: creating groups of users affected by the spectrum request indication from the Incumbent.

In Example 32, the subject matter of Example 31 can optionally include: preparing vacating action to the affected groups of users, in particular vacating action comprising sleep mode and/or blocking of MAC addresses.

In Example 33, the subject matter of any one of Examples 31-32 can optionally include: transmitting a message requesting users to vacate the reserved spectrum to UEs belonging to the affected groups of users.

In Example 34 the subject matter of any one of Examples 27-33 can optionally include: identifying groups of users affected by the enforcement into the mode protecting use of the spectrum by the Incumbent based on the spectrum availability indication from the Incumbent.

In Example 35, the subject matter of Example 34 can optionally include: transmitting a message indicating availability of the reserved spectrum to UEs belonging to the affected groups of users.

In Example 36, the subject matter of any one of Examples 27-35 can optionally include: controlling the at least one UE by a first application programming circuitry; and interacting by a second application programming circuitry with a central controller of the hierarchical communication system in order to allow the central controller take over control of the at least one UE via the first application programming circuitry.

Example 37 is a device for controlling spectrum usage of a hierarchical communication system, in which a spectrum reserved for an Incumbent is usable by at least one user equipment (UE) for transmission when the spectrum is not required by the Incumbent, the device comprising: means for enforcing the at least one UE into a mode protecting use of the spectrum by the Incumbent based on a handover request to a first frequency band from a network device, in particular a CBRS; and means for enabling transmission of the at least one UE using the spectrum reserved for the Incumbent based on a handover request to a second frequency band from the network device.

In Example 38, the subject matter of Example 37 can optionally include: means for receiving the enforcing and/or the enabling from a controller of the hierarchical communication system, in particular a Spectrum Access System (SAS) controller or a Licensed Shared Access (LSA) system controller.

Example 39 is an access point (AP) system for controlling spectrum usage of a hierarchical communication system, in which a spectrum reserved for an Incumbent is usable by at least one user equipment (UE) for transmission when the spectrum is not required by the Incumbent, wherein the AP system comprising a first processing component configured to enforce the at least one UE into a mode protecting use of the spectrum by the Incumbent based on a handover request to a first frequency band from a network device, in particular a CBRS; and wherein the AP system comprises a second processing component configured to enable transmission of the at least one UE using the spectrum reserved for the Incumbent based on a handover request to a second frequency band from the network device.

In Example 40, the subject matter of Example 39 can optionally include: a network interface with a controller of the hierarchical communication system, in particular a Spectrum Access System (SAS) controller or a Licensed Shared Access (LSA) system controller, wherein the AP system is configured to receive the spectrum request indication and/or the spectrum availability indication via the network interface.

Example 41 is a computer readable non-transitory medium on which computer instructions are stored which when executed by a computer cause the computer to perform the method of any one of Examples 27 to 36.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. An access point (AP) device for controlling spectrum usage of a hierarchical communication system, in which a spectrum reserved for an Incumbent is usable by at least one user equipment (UE) for transmission, the AP device comprising a processor configured to:
enforce the at least one UE into a mode protecting use of the spectrum by the Incumbent based on a spectrum request indication from the Incumbent; and enable transmission of the at least one UE using the spectrum reserved for the Incumbent based on a spectrum availability indication from the Incumbent;

the AP device further comprising a network interface with a controller of the hierarchical communication system, wherein the controller comprises a Spectrum Access System (SAS) controller or a Licensed Shared Access (LSA) system controller, wherein the processor is configured to receive the spectrum request indication and/or the spectrum availability indication via the network interface, and the processor is further configured to:

receive a message requesting vacating of the reserved spectrum from the controller of the hierarchical communication system based on the spectrum request indication from the Incumbent; and receive a message making the reserved spectrum available for transmission of the at least one UE from the controller of the hierarchical communication system based on the spectrum availability indication from the Incumbent.

2. The AP device of claim 1, comprising:
a user interface with the at least one UE,
wherein the processor is configured to transmit a message enforcing the at least one UE into the mode protecting use of the spectrum by the Incumbent via the user interface to the at least one UE; and
wherein the processor is configured to transmit a message enabling transmission of the at least one UE using the reserved spectrum via the user interface to the at least one UE.

3. The AP device of claim 1,
wherein the processor is configured to create groups of users affected by the spectrum request indication from the Incumbent.

4. The AP device of claim 3,
wherein the processor is configured to prepare one or more vacating actions to the affected groups of users, wherein the one or more vacating actions comprise sleep mode and/or blocking of MAC addresses.

5. The AP device of claim 3,
wherein the processor is configured to transmit a message requesting users to vacate the reserved spectrum to UEs belonging to the affected groups of users.

6. The AP device of claim 1,
wherein the processor is configured to identify groups of users affected by the enforcement into the mode protecting use of the spectrum by the Incumbent based on the spectrum availability indication from the Incumbent.

7. The AP device of claim 6,
wherein the processor is configured to transmit a message indicating availability of the reserved spectrum to UEs belonging to the affected groups of users.

8. The AP device of claim 1, comprising:
a first application programming circuitry configured to control the at least one UE; and
a second application programming circuitry comprising an interface with the first application programming circuitry,
wherein the second application programming circuitry is configured to interact with a central controller of the hierarchical communication system in order to allow the central controller to take over control of the at least one UE via the interface with the first application programming circuitry.

9. The AP device of claim 8,
wherein the first application programming circuitry is coupled to the at least one UE via a decentralized wireless communication network.

10. The AP device of claim 8,
wherein the second application programming circuitry is configured to interact with the first application programming circuitry via a first external application programming interface (API).

11. The AP device of claim 8,
wherein the second application programming circuitry is configured to interact with the central controller via a second external application programming interface (API).

12. The AP device of claim 11,
wherein the second application programming circuitry comprises a data stack configured to interact with a corresponding data stack of the central controller via the second external API.

13. An access point (AP) system for controlling spectrum usage of a hierarchical communication system, in which a spectrum reserved for an Incumbent is usable by at least one user equipment (UE) for transmission, the AP system comprising a processor configured to:
enforce the at least one UE into a mode protecting use of the spectrum by the Incumbent based on a handover request to a first frequency band from a network device; and
enable transmission of the at least one UE using the spectrum reserved for the Incumbent based on a handover request to a second frequency band from the network device,
wherein the processor is configured to identify groups of users affected by the enforcement into the mode protecting use of the spectrum by the Incumbent based on the handover request to the first frequency band from the network device.

14. The AP system of claim 13, comprising:
a network interface with a controller of the hierarchical communication system, wherein the controller comprises a Spectrum Access System (SAS) controller or a Licensed Shared Access (LSA) system controller,
wherein the AP system is configured to receive the spectrum request indication and/or the spectrum availability indication via the network interface.

15. An access point (AP) device for controlling spectrum usage of a hierarchical communication system, in which a spectrum reserved for an Incumbent is usable by at least one user equipment (UE) for transmission, the AP device comprising a processor configured to:
enforce the at least one UE into a mode protecting use of the spectrum by the Incumbent based on a spectrum request indication from the Incumbent; and
enable transmission of the at least one UE using the spectrum reserved for the Incumbent based on a spectrum availability indication from the Incumbent,
wherein the processor is configured to identify groups of users affected by the enforcement into the mode protecting use of the spectrum by the Incumbent based on the spectrum availability indication from the Incumbent.

16. The AP device of claim 15, comprising:
a user interface with the at least one UE,
wherein the processor is configured to transmit a message enforcing the at least one UE into the mode protecting use of the spectrum by the Incumbent via the user interface to the at least one UE; and wherein the processor is configured to transmit a message enabling transmission of the at least one UE using the reserved spectrum via the user interface to the at least one UE.

17. The AP device of claim 15, wherein the processor is configured to create groups of users affected by the spectrum request indication from the Incumbent.

18. The AP device of claim 17, wherein the processor is configured to prepare one or more vacating actions to the affected groups of users, wherein the one or more vacating actions comprise sleep mode and/or blocking of MAC addresses.

19. The AP device of claim 17, wherein the processor is configured to transmit a message requesting users to vacate the reserved spectrum to UEs belonging to the affected groups of users.

* * * * *